UNITED STATES PATENT OFFICE.

LENA H. TATE, OF CARBONDALE, PENNSYLVANIA.

COMPOSITION FOR STOPPING PERSPIRATION.

1,371,822. Specification of Letters Patent. Patented Mar. 15, 1921.

No Drawing. Application filed April 1, 1920. Serial No. 370,369.

*To all whom it may concern:*

Be it known that I, LENA H. TATE, a citizen of the United States, resident of Carbondale, in the county of Lackawanna and State of Pennsylvania, have made a certain new and useful Invention in Composition for Stopping Perspiration; and I declare the following to be a full, clear, and exact description of the same, such as will enable others skilled in the art to which it appertains to make and use the invention.

The invention has relation to a composition of matter for stopping perspiration, without irritation or prejudice to the health, being designed for use in the toilet of those annoyed by excessive or disagreeable perspiration.

The formula is as follows—

One part aluminum chlorid (crystals).
Three parts distilled water.
One half part borax.
One half part powdered alum.

The result is a colorless liquid in which the aluminum chlorid, the borax, and alum are dissolved, and which when applied according to directions stops the perspiration without itching or irritation or other objectionable result or annoyance.

The solution is applied to arm-pits or feet, with a sponge preferably, at night before retiring from three to ten minutes being allowed for drying. The parts to which the composition or liquid is applied are preferably dusted slightly with talcum powder. The solution is applied each night, until the perspiration is sufficiently stopped or checked, about three or four nights' application being sufficient, after which once or twice a week. The sponge should be washed carefully with hot water after using.

The office of the aluminum chlorid is to stop the perspiration; of the alum and borax to prevent the irritation to delicate skins that would be caused by the use of the aluminum chlorid alone, and of the water to dissolve the ingredients.

I claim:—

1. A composition for stopping perspiration, consisting of aluminum chlorid, alum and borax.

2. A composition for stopping perspiration, consisting of aluminum chlorid one part, borax one-half part and alum one-half part, dissolved in water.

In testimony whereof I affix my signature in presence of two witnesses.

LENA H. TATE.

Witnesses:
MADALIN A. JONES,
NEWELL VAN BERGEN.